April 24, 1951     A. E. MOREILLON     2,550,369
SINGLE-ACTING RECIPROCATING ENGINE
Filed Aug. 7, 1948
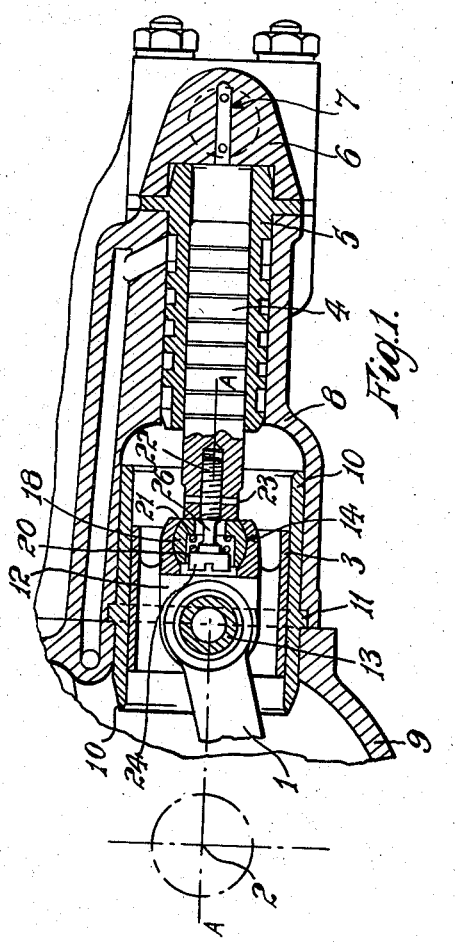
INVENTOR
Albert Edmund Moreillon
by Benj. T. Rauber
his attorney

UNITED STATES PATENT OFFICE 2,550,369

SINGLE-ACTING RECIPROCATING ENGINE

Albert Edmund Moreillon, Yverdon, Switzerland, assignor to Dunlop Rubber Company Limited, London, England, a British company Application August 7, 1948, Serial No. 43,099
In Great Britain July 18, 1947

3 Claims. (Cl. 103—205)

This invention relates to pumps, compressors and other single-acting reciprocating engines of the kind comprising a cross-head and a piston connected to the cross-head.

More particularly the invention is applicable to the third and higher stages of high pressure compressors in which the piston is subjected to substantial end thrust. Such a compressor is particularly useful for providing the high pressure fluid supply for an aircraft.

It is already known in such compressors to construct the piston separately from the cross-head and to provide freedom of movement between these two elements to allow for lateral misalignment between the cross-head guides and the cylinder bore. For instance in one arrangement the end of the piston butts against the face of the cross-head and is rounded or cut away to permit of relative lateral displacement due to any misalignment of the two elements which may be present, for instance, as a result of slight imperfections in manufacture. In another arrangement the end of the cross-head has a projecting portion with a cavity that embraces an enlarged head at the end of the piston, the arrangement being similar to the connection between a threaded spindle and a valve in a stop valve. Both of such arrangements permit the relative lateral displacement of cross-head and piston when the axes of these elements are not collinear. They are however subject to the disadvantage that in the event of any angular misalignment occurring between the axes of the cross-head guides and the cylinder, the thrust of the cross-head on the piston has a lateral component tending to displace the piston laterally relative to the cylinder with the result that undue wear occurs between the piston and part of the cylinder walls. This is particularly disadvantageous in, for example, compressor developing high fluid pressures in which leakage between the piston and cylinder walls must be reduced to a minimum.

The object of this invention is to provide a reciprocating engine in which undue wear between the piston connected to a cross-head and the cylinder is eliminated even if misalignment occurs between the axis of movement of the cross-head and the piston.

According to the invention a single-acting reciprocating engine of the kind comprising a cross-head element and a piston element is characterised in that the cross-head and piston are connected together by a ball and socket arrangement.

Preferably the said cross-head has a part-spherical socket associated therewith, and a part-spherical member is movably housed within the said socket and is connected to the said piston. Furthermore preferably the connection between the said part-spherical member and the said piston permits relative lateral movement of member and piston.

The invention will now be more particularly described with reference to the accompanying drawings illustrating two forms of the invention applied to the third stage of a three-stage compressor, similar references being used throughout the views to denote corresponding parts.

Fig. 1 is a sectional view taken longitudinally through the cylinder and piston constituting the third stage of a compressor.

Fig. 2 is a fragmentary plan view of Fig. 1 on the lines A—A.

Fig. 3 is an end elevation of the cross-head only,

Fig. 4 is a fragmentary longitudinal sectional view of an alternative form of the invention.

Referring to Figs. 1-3 the connecting rod 1 is operated by a crankshaft having an axis of rotation indicated at 2 and its little end is connected to a cross-head 3. Connected to the cross-head in a manner to be hereinafter described is a piston 4 operating in a cylinder 5 the head 6 of which has inlet and outlet valves indicated at 7.

The cylinder 5 is located in a casing 8 secured to the crankcase 9, and mounted within said casing and crankcase is a cylindrical liner 10 having a peripheral flange 11 to prevent axial movement thereof. The bore of the liner is cylindrical and is slidably engaged by the cross-head 3 which has a cylindrical periphery and is formed with bosses 12 having co-axial holes for the gudgeon pin 13. Formed in the cross-head 3 is a part-spherical socket 14 the entrance 15 of which has two opposed parallel sidewalls 16 and two arc-shaped walls 17 the axis of which is co-axial with the axis of the liner and the radius of curvature of which is equal to the radius of the part-spherical socket. Loosely engaging the socket 14 is a part-spherical member 18 having parallel faces 19 and a hole 20 formed with a shoulder 21, the axis of said hole being disposed normal to the faces 19.

Passing through the hole 20 is a screw-threaded connecting pin 22 which engages a screw-threaded hole formed in the piston 4, and a cotter pin 23 retains said engagement. The connecting pin 22 has a head 24 and disposed between said head and the shoulder 21 is a compression spring 25 which urges the inner end face of the piston into contact with a face 19 of the member 18. The connecting pin, intermediate the head 24 and its screw-threaded end, has a reduced diameter portion 26 for a purpose to be hereinafter referred to.

It should be appreciated that to connect the piston to the cross-head, the member 18 is passed through the entrance 15 with its faces 19 opposite the sidewalls 16 of said entrance, and the member is then turned through an angle of 90° to the position shown in Figs. 1 and 2. The connecting pin 22 can then be engaged with the piston 4.

Referring to Fig. 4 the part-spherical socket 14 is formed partly in the cross-head 3 and partly in a plate 27 which is secured to said cross-head by screw-pins 28.

With either of the above described arrangements, in the event of misalignment existing between the axis of movement of the cross-head and the piston, both angular and lateral relative movement between the cross-head and the piston is permitted so that undue wear of the piston and cylinder is avoided.

Furthermore should the piston seize within the cylinder, this will usually occur when the piston is adjacent the head of said cylinder and, during inward movement of the piston, the tension load on the connecting pin is appreciably greater than normal and causes said pin to fracture at its reduced diameter portion. During the next outward stroke of the cross-head the piston is left in its outermost position within the cylinder and further damage is avoided.

Having described my invention what I claim is:

1. A single-acting reciprocating engine which comprises a cross head, a piston and a connection between said cross head and said piston which comprises a socket mounted on the cross head, a part-spherical member rotatably housed in said socket and having an opening aligned with said piston, a pin secured to said piston and extending into said opening, said pin being of smaller diameter than said opening to permit lateral movement between said member and said piston and a spring between said pin and said part-spherical member to yieldably connect said piston to said part-spherical member.

2. The engine of claim 1 in which said opening is provided with a ledge and said pin is provided with a head and in which said spring is confined between said head of said pin and said ledge.

3. The engine of claim 1 wherein the socket comprises a part connected to the cross head and a plate secured to the cross head.

ALBERT EDMUND MOREILLON.

REFERENCES CITED

The following references are of record in the file of this patent:

Ser. No. 418,664, Neugebauer (A. P. C.), published May 25, 1943.